US011825852B2

(12) United States Patent
Biondi et al.

(10) Patent No.: US 11,825,852 B2
(45) Date of Patent: *Nov. 28, 2023

(54) MACHINE FOR MAKING FILLED PASTA (71) Applicant: Azionaria Costruzioni Macchine Automatiche A.C.M.A. S.p.A., Bologna (IT)

(72) Inventors: Andrea Biondi, Bologna (IT); Riccardo Ruggeri, Bologna (IT); Ivanoe Bertuzzi, Casalecchio di Reno (IT); Enrica Vassallo, Bologna (IT); Marco Garganelli, Aregelato (IT); Matteo Lenzi, Bologna (IT)

(73) Assignee: AZIONARIA COSTRUZIONI MACCHINE AUTOMATICHE A.C.M.A. S.P.A., Bologna (IT)

( * ) Notice: Subject to any disclaimer, the term of this patent is extended or adjusted under 35 U.S.C. 154(b) by 900 days.

This patent is subject to a terminal disclaimer.

(21) Appl. No.: 16/482,503

(22) PCT Filed: Feb. 21, 2018

(86) PCT No.: PCT/IB2018/051053
§ 371 (c)(1),
(2) Date: Jul. 31, 2019

(87) PCT Pub. No.: WO2018/154450
PCT Pub. Date: Aug. 3, 2018

(65) Prior Publication Data
US 2020/0383339 A1 Dec. 10, 2020

(30) Foreign Application Priority Data
Feb. 21, 2017 (IT) ........................ 102017000019144

(51) Int. Cl.
*A21C 9/06* (2006.01)
*A21C 11/04* (2006.01)
(Continued)

(52) U.S. Cl.
CPC .............. *A21C 9/066* (2013.01); *A21C 11/04* (2013.01); *A21C 9/08* (2013.01); *A21C 11/06* (2013.01); *A23L 7/11* (2016.08)

(58) Field of Classification Search
CPC ......... A21C 9/068; A21C 11/06; A21C 11/04; A21C 9/066; B29C 2043/461;
(Continued)

(56) References Cited

U.S. PATENT DOCUMENTS 1,844,142 A * 2/1932 Barili ..................... A21C 9/066
99/450.2
2,227,728 A * 1/1941 Lombi ................... A21C 9/066
99/450.2
(Continued)

FOREIGN PATENT DOCUMENTS

CN 2689707 Y 4/2005
CN 103429090 A 12/2013
(Continued)

OTHER PUBLICATIONS

Guareschi—U.S. Appl. No. 16/482,477, filed Jul. 31, 2019.
(Continued)

*Primary Examiner* — Emmanuel S Luk
(74) *Attorney, Agent, or Firm* — SHUTTLEWORTH & INGERSOLL, PLC; Timothy J. Klima (57) ABSTRACT

A machine for making filled pasta products and which comprises a first feeding device for feeding a first layer of pasta dough and a second feeding device for feeding a second layer of pasta dough; a shaping device for shaping the filled pasta products, located downstream of the first and
(Continued)

second feeding devices, with reference to the direction of unrolling the first and second layers of pasta dough; the shaping device includes a first and a second advancing and shaping roller for advancing and shaping the first and the second layer, respectively, each including a respective supporting roller having on its peripheral surface respective moulds for shaping the respective first and second layers of dough and each configured to be assembled to and disassembled from the respective supporting roller.

7 Claims, 5 Drawing Sheets

(51) Int. Cl.
*A23L 7/109* (2016.01)
*A21C 9/08* (2006.01)
*A21C 11/06* (2006.01)

(58) Field of Classification Search
CPC ...... B29C 2043/467; B29C 2043/3678; B29C 65/7455; B29C 65/74; B29C 65/749; B30B 3/005; B30B 11/003
See application file for complete search history.

(56) References Cited

U.S. PATENT DOCUMENTS

| | | | | |
|---|---|---|---|---|
| 2,387,747 A * | 10/1945 | Cowley | A61J 3/07 | |
| | | | 425/804 | |
| 2,714,861 A * | 8/1955 | Castronuovo | A21C 9/066 | |
| | | | 99/450.2 | |
| 2,774,313 A * | 12/1956 | Lombi | A21C 9/066 | |
| | | | 99/450.2 | |
| 3,593,676 A | 7/1971 | Reid et al. | | |
| 3,603,270 A | 9/1971 | Tangel | | |
| 3,605,641 A * | 9/1971 | Shuster | A21C 1/06 | |
| | | | 425/513 | |
| 4,012,888 A * | 3/1977 | Nichols | B65B 59/04 | |
| | | | 53/131.5 | |
| 4,028,024 A * | 6/1977 | Moreland | A61J 3/07 | |
| | | | 425/804 | |
| 4,578,027 A | 3/1986 | Koppa et al. | | |
| 4,848,218 A * | 7/1989 | Battaglia | A21C 9/066 | |
| | | | 99/450.2 | |
| 4,880,371 A | 11/1989 | Spinelli | | |
| 4,941,402 A * | 7/1990 | D'Alterio | A21C 9/066 | |
| | | | 99/450.6 | |
| 5,010,807 A | 4/1991 | Anderson et al. | | |
| 5,297,947 A | 3/1994 | Cardinali | | |
| 5,558,894 A * | 9/1996 | Henson | A23L 7/13 | |
| | | | 426/514 | |
| 5,590,589 A | 1/1997 | Battaglia | | |
| 6,099,885 A * | 8/2000 | Nelson | A23P 20/20 | |
| | | | 99/450.2 | |
| 6,230,613 B1 * | 5/2001 | Porcari | A21C 9/066 | |
| | | | 99/450.2 | |
| 6,302,013 B1 * | 10/2001 | Batagllia | A21C 9/066 | |
| | | | 99/450.2 | |
| 7,284,973 B2 * | 10/2007 | van Esbroeck | A23L 13/03 | |
| | | | 425/134 | |
| 7,490,456 B2 * | 2/2009 | Draisey | B65B 61/00 | |
| | | | 53/DIG. 2 | |
| 9,414,605 B2 * | 8/2016 | Le Paih | A22C 7/0076 | |
| 9,693,571 B2 | 7/2017 | Cocchi et al. | | |
| 2003/0024360 A1 | 2/2003 | Ribble | | |
| 2005/0226963 A1 * | 10/2005 | Addington | A23L 7/13 | |
| | | | 426/104 | |
| 2010/0173052 A1 * | 7/2010 | Suski | A21C 5/003 | |
| | | | 425/294 | |
| 2015/0336691 A1 * | 11/2015 | Fowler | B65D 65/46 | |
| | | | 53/553 | |
| 2015/0366222 A1 * | 12/2015 | Bertuzzi | A21C 9/06 | |
| | | | 99/450.7 | |

FOREIGN PATENT DOCUMENTS

| | | |
|---|---|---|
| CN | 103501620 A | 1/2014 |
| CN | 203435611 U | 2/2014 |
| CN | 203692314 U | 7/2014 |
| CN | 104423099 A | 3/2015 |
| CN | 205727837 U | 11/2016 |
| EP | 0307614 A1 | 3/1989 |
| EP | 2092828 A2 | 8/2009 |
| EP | 2947993 A1 | 12/2015 |
| FR | 1160504 A | 7/1958 |
| GB | 2171225 A | 8/1986 |
| WO | 8804891 A1 | 7/1988 |
| WO | 9730592 A1 | 8/1997 |
| WO | 2012107236 A2 | 8/2012 |

OTHER PUBLICATIONS

Biondi—U.S. Appl. No. 16/482,512, filed Jul. 31, 2019.
International Search Report and Written Opinion from counterpart International Application No. PCT/IB2018/051053.
Chinese Office Action dated May 8, 2021 from counterpart Chinese Patent Application No. 201880012663.1.
Chinese Office Action dated Dec. 2, 2020 from counterpart Chinese Patent Application No. 201880012663.1.
Chinese Office Action dated Dec. 22, 2020 from related Chinese Patent Application No. 201880012618.6.
International Search Report and Written Opinion dated Jun. 7, 2018 from related PCT App No. PCT/IB2018/051049.
International Search Report and Written Opinion dated Jun. 7, 2018 from related PCT App No. PCT/IB2018/051064.

* cited by examiner

MACHINE FOR MAKING FILLED PASTA

This application is the National Phase of International Application PCT/IB2018/051053 filed Feb. 21, 2018 which designated the U.S.

This application claims priority to Italian Patent Application No. 102017000019144 filed Feb. 21, 2017, which application is incorporated by reference herein.

TECHNICAL FIELD

This invention relates to a machine for making filled pasta.

The term "filled pasta" is used to mean a type of pasta consisting of one or more layers of dough stuffed with a filling of meat, fish, vegetable or cheese.

For example, ravioli is a filled pasta product of circular shape having, on each side of the dough layer, a respective bulge formed by the filling and also known as "belly" in the jargon of the trade.

To be able to supply it to large-scale distributors, filled pasta is made by automatic machines.

BACKGROUND ART

Prior art automatic machines, however, do not allow changeovers to be carried out quickly and cleaning operations to remove dough residues are slow and painstaking, if not impossible, and involve lengthy machine down times.

AIM OF THE INVENTION

In this context, the need is felt to overcome these drawbacks with a machine for making filled pasta comprising a first feeding device for feeding a first layer of pasta dough and a second feeding device for feeding a second layer of pasta dough and a shaping device for shaping the filled pasta products, located downstream of the first and second feeding devices, with reference to the direction of advancing the first and second layers of pasta dough.

The shaping device is configured to advance the first and second layers of pasta dough and, as it advances them, to also shape the first and second layers in such a way as to receive a respective filling and to join the first and second layers of dough in a respective joining zone.

The shaping device is configured to cut the first and second layers, thereby individually separating each product from the first and second layers of dough.

The shaping device comprises a first and a second advancing and shaping roller for the first and the second layer, respectively, disposed to face and be tangent to each other at a coupling station for coupling the first and the second layer around a respective filling.

The first roller and the second roller each comprise a respective supporting roller having on its peripheral surface respective moulds for shaping the respective first and second layers of dough and are each configured to be assembled to and disassembled from the respective supporting roller.

Advantageously, since they are configured to be assembled to and disassembled from respective supporting rollers, the moulds for shaping the respective first and second layers of dough allow easy changing over between different types of filled pasta products and facilitate maintenance operations on the shaping device itself.

BRIEF DESCRIPTION OF THE DRAWINGS

Further features and advantages of the invention are more apparent in the non-limiting description which follows, of preferred but non-exclusive embodiments of a machine for making filled pasta as illustrated in the accompanying drawings, in which.

DETAILED DESCRIPTION OF PREFERRED EMBODIMENTS OF THE INVENTION

Figure 1:
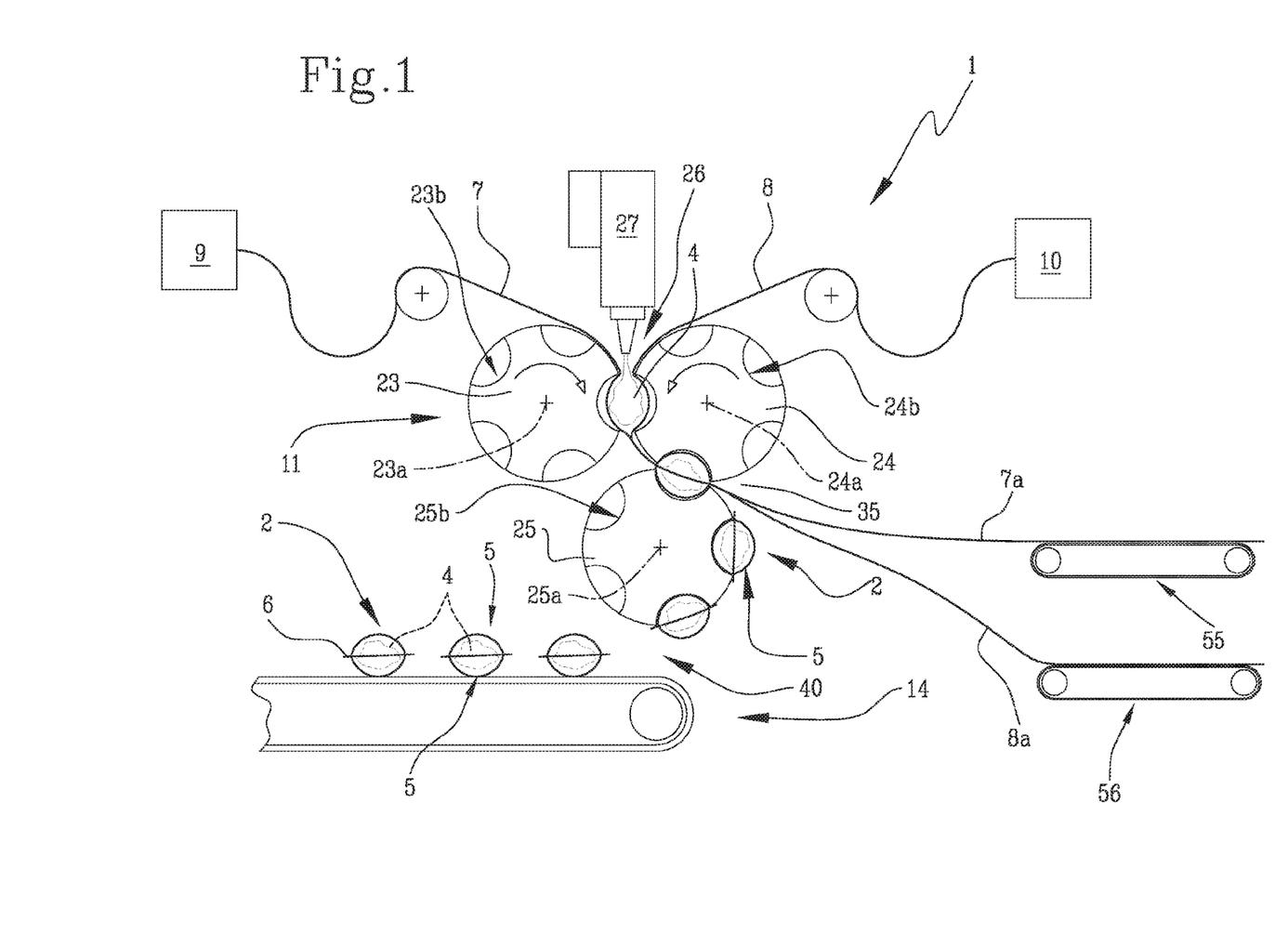
FIG. 1 shows a schematic front view of the machine for making filled pasta according to this invention.

The reference numeral 1 denotes a machine for making filled pasta products.

The filled pasta products 2 of this specification comprise two layers of pasta dough 7, 8, specifically a first dough layer 7 and a second dough layer 8 enclosing between them a filling 4, for example based on meat, fish, vegetables or cheese.

The dough layers 7, 8 of the filled pasta products 2 are superposed and sealed to each other along a common joining zone 6 in order to prevent the filling 4 from escaping.

The filled pasta products 2 of this specification have, on each side defined by the first and the second dough layer 7 and 8, a respective bulge 5, known as "belly" in the jargon of the trade, formed by the filling 4 under the respective dough layer 7 and 8.

The filled pasta product 2 of this specification is known by the term "ravioli". More specifically, the ravioli of the specification is disc-shaped and thus, the joining zone 6 where the dough layers 7 and 8 are sealed to each other has the shape of a circular crown 6 surrounding the filling 4.

The machine 1 of this specification comprises a first feeding device 9 for feeding a first layer 7 of pasta dough and a second feeding device 10 for feeding a second layer 8 of pasta dough.

A shaping device 11 for shaping the filled pasta products 2 is located downstream of the first and second feeding devices 9 and 10, with reference to the direction of unrolling the first and second layers 7 and 8 of pasta dough.

The shaping device 11 is configured to advance the first and second layers 7 and 8 of pasta dough and, while it advances them, to shape the dough layers 7 and 8 in such a way that they can receive the filling 4, and to press them against each other in order to define the joining zone 6 where the first and second dough layers 7 and 8 are sealed to each other around the filling 4.

The shaping device 11 is configured to cut the first and second dough layers 7 and 8, individually separating each filled pasta product 2 from the dough layers 7 and 8 as they advance in the device 11.

Downstream of the shaping device 11, the filled pasta products 2 are transported by a conveyor line 14 for further processing in other production machines.

Figure 2:
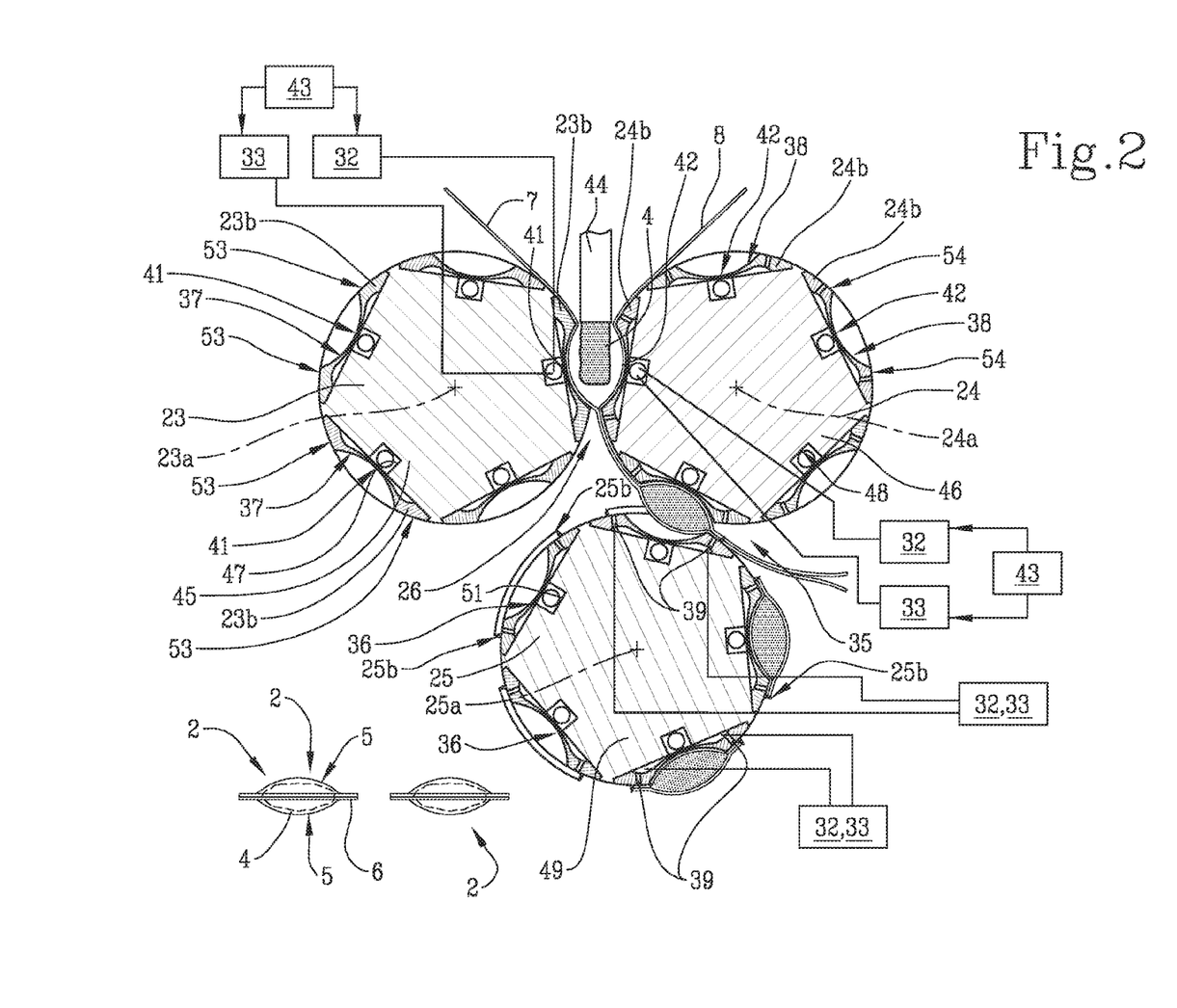
FIG. 2 is a scaled-up, schematic front view of a detail from FIG. 1.

The shaping device 11 of the machine 1 comprises a first and a second roller 23 and 24 for advancing and shaping the first and the second layer 7 and 8, respectively.

The first and second rollers 23 and 24 rotate about respective axes of rotation 23a and 24a.

The axes of rotation 23a and 24a of the rollers 23 are 24 are parallel to each other.

The first and the second roller 23 and 24 are disposed to face and be tangent to each other at a coupling station 26 for coupling the first and the second layer 7, 8 around the respective filling 4.

The first and the second roller 23 and 24 of the shaping device 11 each have on the peripheral surface respective moulds 23b and 24b which are configured to shape the respective dough layer 7, 8 so that they can receive the filling 4.

Figure 3:
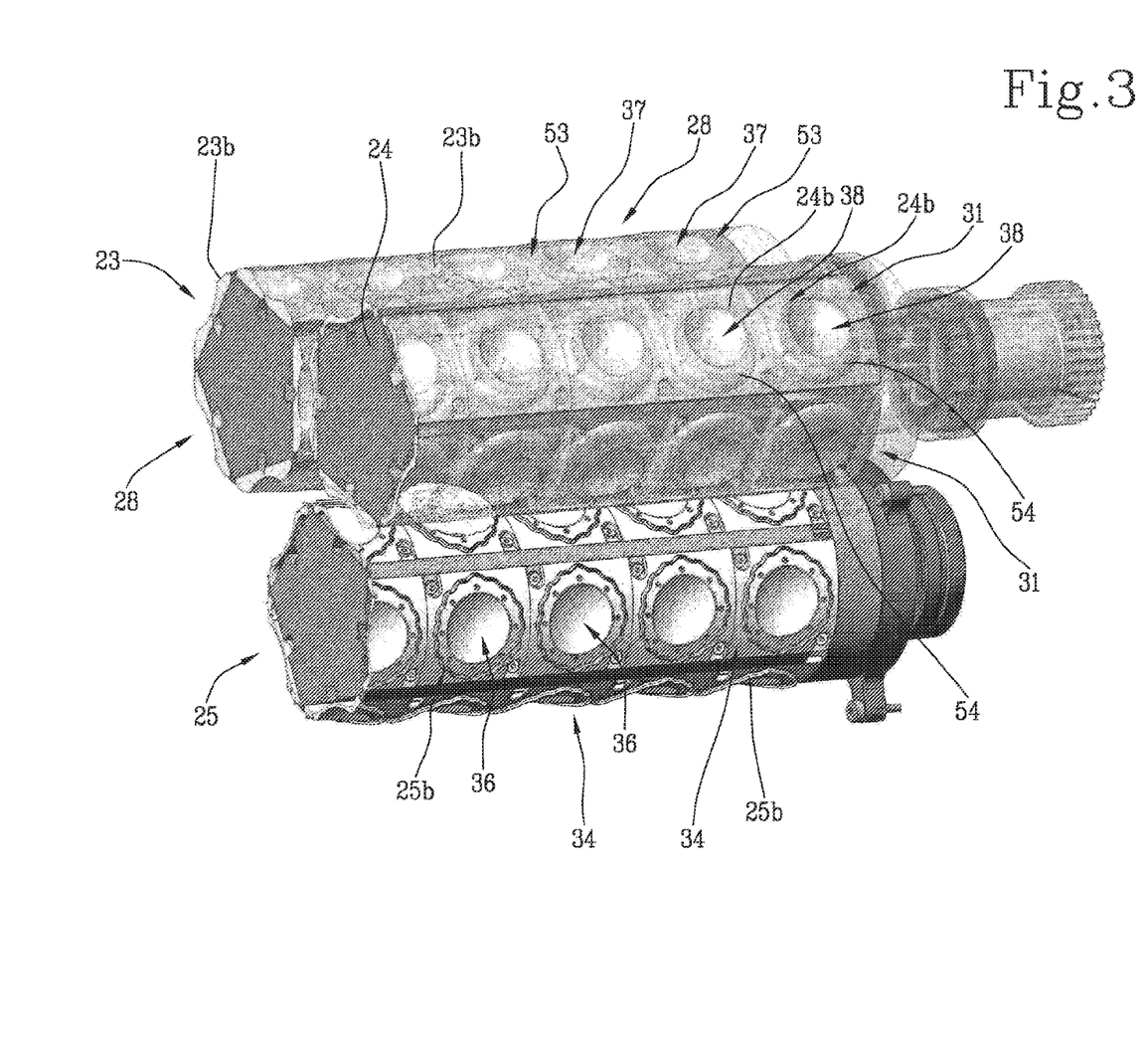
FIG. 3 is a scaled-up schematic perspective view of a detail from FIGS. 1 and 2.

The moulds 23b and 24b of the first and the second roller 23, and 24 comprise respective hollows 37, 38, concave relative to the respective peripheral outside surface of the first and second rollers 23 and 24, for receiving the respective layers of dough 7 and 8.

The concave peripheral surface of the hollows 37 and 38 of the first and second rollers 23 and 24, which act in conjunction at the coupling station 26 for coupling the first and the second layer 7 and 8, allow shaping a respective bulge 5 of the filled pasta 2.

The moulds 23b and 24b of the first and the second roller 23, and 24 comprise respective pressing zones 53 and 54 surrounding the respective hollows 37 and 38.

The pressing zones 53 and 54 of the respective moulds 23b and 24b of the first and the second roller 23, and 24 acting in conjunction at the coupling station 26 allow joining the first and the second layer 7 and 8 to each other to define the joining 6 on the product 2 where the pasta is sealed.

The moulds 23b on the first roller 23 are disposed along respective rows 28, each extending along a direction parallel to the axis of rotation 23a of the first roller 23.

With reference to the outside surface of the first roller 23, the rows 28 of moulds 23b are equispaced from each other.

The moulds 24b on the second roller 24 are disposed along respective rows 31, each extending along a direction parallel to the axis of rotation 24b of the second roller 24.

With reference to the outside surface of the second roller 24, the rows 31 of moulds 24b are equispaced from each other.

The shaping device 11 comprises dispensing means 27 for delivering the filling 4 to the first and second layers 7 and 8 as the first and second rollers 23 and 24 advance them to the coupling station 26.

The dispensing means 27 for delivering the filling 4 are disposed between the first and the second roller 23 and 24.

More specifically, the dispensing means 27 for delivering the filling 4 are configured to feed the filling 4 to the moulds 23b and 24b of the first and second rollers 23 and 24 which face each other at the coupling station 26 for coupling the first and second layers 7 and 8.

The dispensing means 27 comprise a plurality of dispensing nozzles 44 for delivering the filling 4.

Each nozzle 44 is configured to deliver the filling 4 to a respective pair of moulds 23b and 24b of the first and second rollers 23 and 24 which face each other at the coupling station 26 for coupling the first and second layers 7 and 8.

The number of nozzles 44 of the dispensing means 27 is equal to the number of moulds 23b and 24b disposed along each row 28, 31 on the first and second rollers 23 and 24.

Each nozzle 44 is configured to move towards and away from the respective pair of moulds 23b and 24b of the first and second rollers 23 and 24 which face each other at the coupling station 26 for coupling the first and second layers 7 and 8.

The shaping device 11 of the machine 1 comprises suction means 32 which are in fluid communication with the first and the second roller 23 and 24.

More specifically, the suction means 32 are in fluid communication with the hollows 37 and 38 for receiving the first and second layers 7 and 8 on the first and second rollers 23 and 24.

The receiving hollows 37 of the first roller 23 have respective air inlet mouths 41 in fluid communication with the suction means 32.

The receiving hollows 38 of the second roller 24 have respective air inlet mouths 42 in fluid communication with the suction means 32.

More specifically, the suction means 32 are configured to operate at least at the moulds 23b and 24b of the first and second rollers 23 and 24 in transit through the coupling station 26 for coupling the first and second layers 7 and 8 around the filling 4.

Advantageously, the suction means 32 cause the first and the second layer 7 and 8 to adhere to the surface of the respective moulds 23b and 24b, adopting the shape thereof so as to make it easier for them to receive the filling 4.

The shaping device 11 of the machine 1 comprises blowing means 33.

More specifically, the blowing means 33 are in fluid communication with the hollows 37 and 38 for receiving the first and second layers 7 and 8 on the first and second rollers 23 and 24.

The mouths 41 of the receiving hollows 37 of the first roller 23 are in fluid communication with the blowing means 33 to let air out.

The mouths 42 of the receiving hollows 38 of the second roller 24 are in fluid communication with the blowing means 33 to let air out.

Advantageously, the blowing means 33 cause the first and the second layer 7 and 8 to come away to the surface of the respective moulds 23b and 24b and to be wrapped around the respective filling 4, facilitating its detachment from the dispensing means 27.

The machine 1 comprises a control unit 43 configured to control the switching on and off of the suction means 32.

The control unit 43 is configured to control the switching on and off of the blowing means 33.

The control unit 43 is configured to switch on the suction means 32 during transit of the moulds 23b and 24b of the first and second rollers 23 and 24 in the coupling station 26.

In a first operating mode, the control unit 43 is configured to switch on the suction means 32 before the dispensing means 27 release the filling 4 into the moulds 23b and 24b of the first and second rollers 23 and 24 in transit in the coupling station 26.

That way, the first and the second layer 7 and 8 are shaped by the respective moulds 23b and 24b to receive the filling 4.

In this operating mode, the control unit 43 is configured to switch off the suction means 32 once the dispensing means 27 have released the filling 4 into the respective moulds 23b and 24b.

If necessary, after the suctions means 32 have been switched off, the control unit 43 switches on the blowing means 33 in such a way that the first and second layers 7 and 8 come away to the surface of the respective moulds 23b and 24b and are wrapped around the respective filling 4, facilitating its detachment from the dispensing means 27.

In a second operating mode, the control unit 43 is configured to switch on the suction means 32 at the same time as the dispensing means 27 release the filling 4 into the moulds 23b and 24b of the first and second rollers 23 and 24 in transit in the coupling station 26.

This operating mode allows creating a light vacuum in the hollows 37 and 38 of the moulds 23b and 24b to facilitate delivery of the filling 4 from the dispensing means 27.

The control unit 43 is configured to be programmed by an operator to set the operating mode as a function of the physical properties of the filling 4.

The shaping device 11 comprises a cutting roller 25 acting in conjunction with one of either the first roller 23 or the second roller 24, specifically with the second roller 24, in order to individually separate each product 2 from the first and the second layer 7 and 8 of dough.

The cutting roller 25 and the roller 24 of the shaping device it acts in conjunction with, in particular the second roller 24, are tangent to each other at a cutting station 35 where each product 2 is separated from the first and the second layer 7 and 8 of dough.

The cutting roller 25 releases the filled pasta 2 onto the conveyor line 14 at a release station 40.

The cutting roller 25 rotates about its axis of rotation 25a.

The axis of rotation 25a of the cutting roller 25 is parallel to the axes of rotation 23a and 24a of the advancing and shaping rollers 23, 24.

On the peripheral surface of it, the cutting roller 25 has respective cutting edges 25b shaped to cut the dough layers 7, 8 at their sealing zone 6.

The cutting edges 25 are shaped to match the moulds 24b of the roller 24 of the shaping device 11 it acts in conjunction with, relative in particular to the moulds 24b of the second roller 24, in such a way as to oppose them along the perimeter of the pressing zone 54 of the respective mould 24b.

That way, the cutting edge 25b of the cutting roller 25 operates at the periphery of the sealed pasta zone 6 of the product 2 without cutting other portions of the first and second layers 7 and 8 outside the mould 24b of the second roller 24.

Advantageously, downstream of the cutting station 35, the offcuts of the first layer 7 and the offcuts of the second layer 8 can be advanced separately because they are not sealed to each other.

Advantageously, the possibility of recovering the offcuts 7a of the first dough layer 7 separately from the offcuts 8a of the second dough layer 8 allows using layers 7 and 8 made of dough having different properties, such as doughs of different colours, for example.

Downstream of the cutting roller 25, the machine 1 comprises a conveying line 55 for the offcuts 7a of the first dough layer 7 and a separate conveying line 56 for the offcuts 8a of the second dough layer 8.

The cutting edges 25b of the cutting roller 25 are disposed along respective rows 34, each extending along a direction parallel to the axis of rotation 25a of the cutting roller 25.

With reference to the outside surface of the cutting roller 25, the rows 34 of cutting edges 25b are equispaced from each other.

The cutting roller 25 of the machine 1 according to this invention has, on the peripheral outside surface of it, a plurality of hollows 36, each of which is adapted to receive a respective product 2.

Each hollow 36 is surrounded by a respective shaped cutting edge 25b.

Each hollow 36 of the cutting roller 25 is concave relative to the peripheral outside surface of the cutting roller 25 so that the surface of the hollow 36 can receive the bulge 5 of the filled pasta 2, defined by the filling 4 under the dough layer 3.

Each hollow 36 of the cutting roller 25 has at least one air suction or blowing mouth 39 configured to be in fluid communication with the suction means 32 and with the blowing means 33 as a function of the position of the hollow 32 during the rotation of the cutting roller 25.

At the cutting station 35, the mouth 39 of each hollow 36 of the cutting roller 25 is in fluid communication with the suction means 32 so that each hollow 36 receives the respective product 2, separated from the first and second layer 7 and 8, and then releases it onto the conveyor line 14.

During rotation of the cutting roller 25 about its axis of rotation 25a from the cutting station 35 to the release station 40, each hollow 36 of the cutting roller 25 holds the respective product 2 by suction thanks to the fluid connection between the respective mouth 39 and the suction means 32.

At the release station 40, the mouth 39 of each hollow 36 of the cutting roller 25 is in fluid communication with the blowing means 33 so as to expel the product 2 from the hollow 36.

Advantageously, the cutting roller 25 of the machine 1 allows handling the product 2 in accurately and precisely in terms of its position and centring, thus increasing the quality of the filled pasta 2 made by the machine 1.

Figure 4:
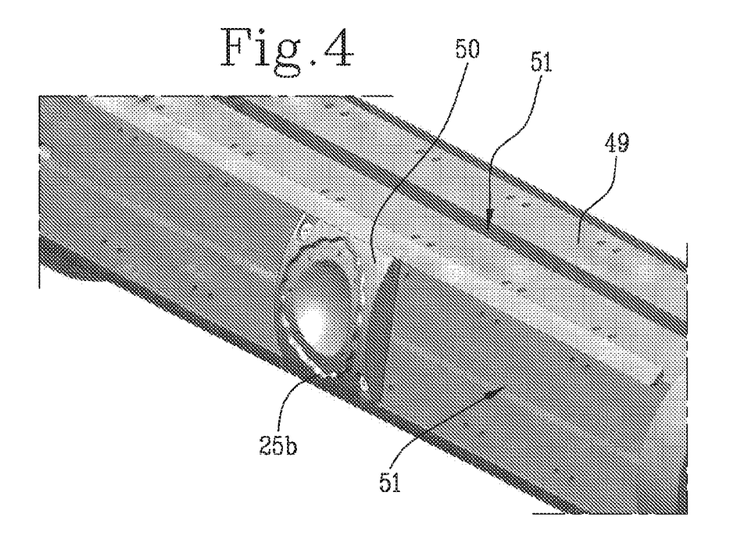
FIGS. 4 and 5 are schematic perspective views of a detail from FIG. 3.
Figure 5:
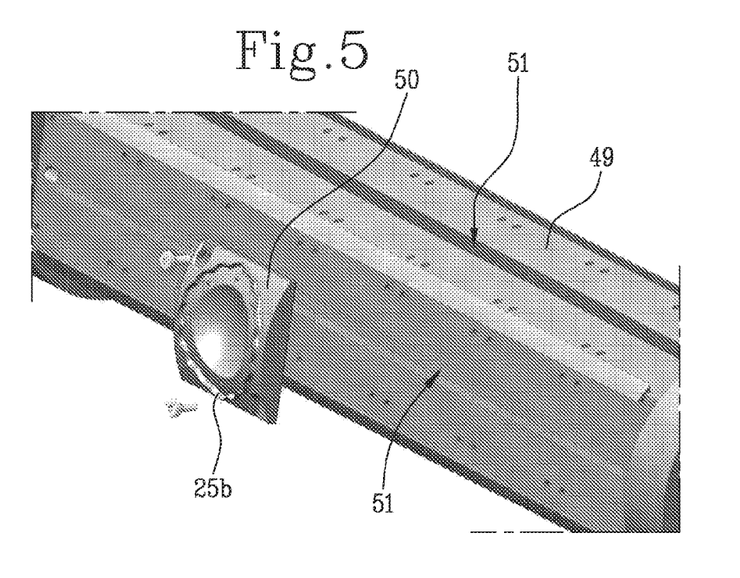
Figure 6:
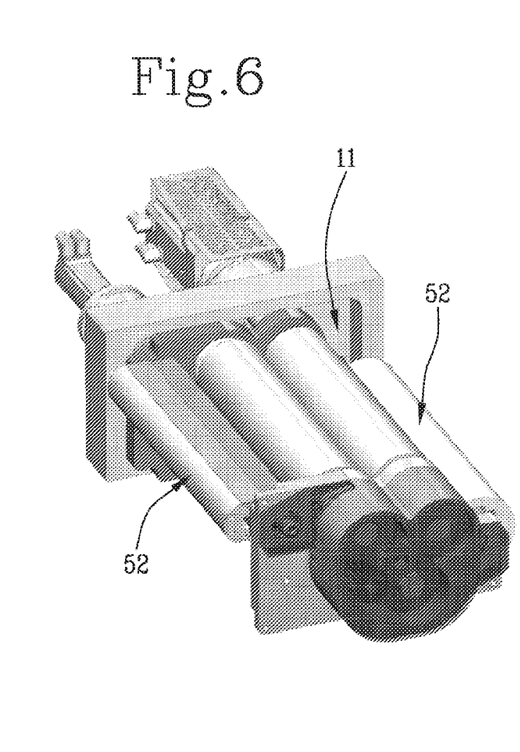
FIGS. 6 and 7 are schematic perspective views illustrating the mode of assembling and removing the shaping device of the machine according to this invention.
Figure 7:
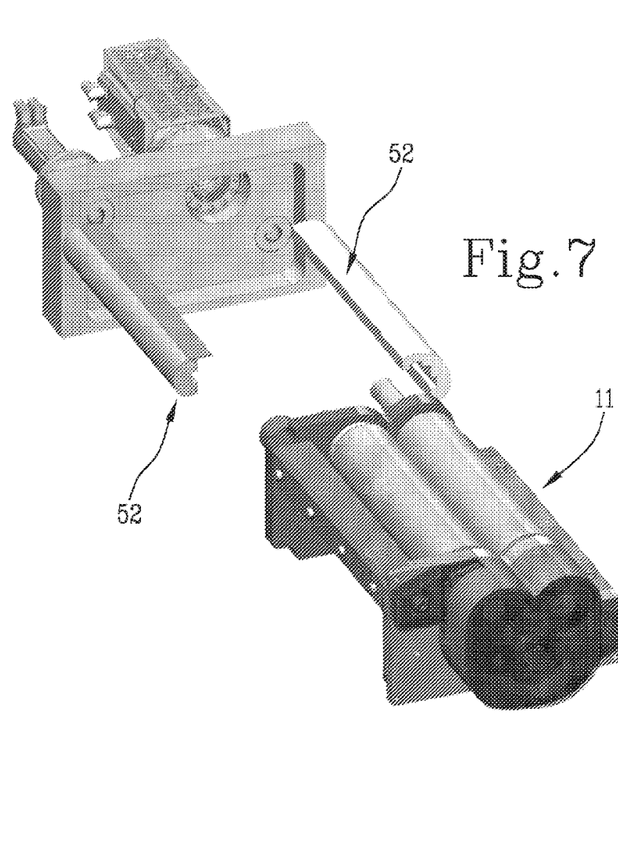

In the machine 1 according to this invention, in order to allow rapid changeover and reduce down time of the machine 1, the first roller 23 and the second roller 24 comprise a respective supporting roller 45, 46 on which the moulds 23b and 24b of the first roller 23 and second roller 24 can be mounted.

In other words, the moulds 23b and 24b of the first roller 23 and second roller 24 are configured to be assembled and disassembled to and from the supporting roller 45 and 46 of the first and the second roller 23 and 24.

Advantageously, the possibility of assembling and disassembling the moulds 23b and 24b of the first roller 23 and second roller 24 allows the supporting rollers 45 and 46 of the first and the second roller 23 and 24 to be used for two or more sizes of filled pasta 2.

The supporting roller 45 of the first roller 23 has a plurality of grooves 47 defining means for conveying air out of the suction means 32 or out of the blowing means 33.

With reference to the supporting roller 45 of the first roller 23, each groove 47 extends in a direction parallel to the axis of rotation 23a of the first roller 23 and is configured to convey the air to a respective row 28 of moulds 23b.

The mouths 41 of the hollows 37 of the first roller 23, once assembled to the supporting roller 45, are in fluid communication with the respective groove 47.

Thus, the supporting roller 45 of the first roller 23 has a plurality of grooves 47 which are equispaced from each other along the peripheral surface of the supporting roller 45 of the first roller 23.

The supporting roller 46 of the second roller 24 has a plurality of grooves 48 defining means for conveying air out of the suction means 32 or out of the blowing means 33.

With reference to the supporting roller 46 of the second roller 24, each groove 48 extends in a direction parallel to the axis of rotation 24a of the second roller 24 and is configured to convey the air to a respective row 31 of moulds 24b.

The mouths 42 of the hollows 38 of the second roller 24, once assembled to the moulds 24b on the supporting roller 46, are in fluid communication with the respective groove 48.

Thus, the supporting roller 46 of the second roller 24 has a plurality of grooves 48 which are equispaced from each other along the peripheral surface of the supporting roller 46 of the second roller 24.

Advantageously, the grooves 47, 48 made on the respective supporting roller make it easier to clean the first and second rollers 23 and 24, thus limiting maintenance times and costs.

In the machine 1 according to this invention, in order to allow rapid changeover and reduce down time of the machine 1, the cutting roller 25 comprises a respective supporting roller 49 on which the cutting edges 25b can be mounted.

The invention claimed is:

1. A machine for making pasta products filled with a filling, comprising
    a first feeding device for feeding a first layer of pasta dough and a second feeding device for feeding a second layer of pasta dough;
    a shaping device for shaping the pasta products, located downstream of the first and second feeding devices, with reference to a direction of unrolling the first and second layers of pasta dough; the shaping device being configured to advance the first and second layers of pasta dough and being also configured, while advancing the first and second layers of pasta dough, to shape the first and second layers of pasta dough to receive a respective filling and to join the first and second layers of dough in a respective joining zone; the shaping device being configured to cut the first and second layers of pasta dough to individually separate each pasta product from the first and second layers of dough;
    the shaping device comprising first and second rollers configured for advancing and shaping roller the first and the second layers of pasta dough, respectively, the first and second rollers disposed to face and be tangent to each other at a coupling station for coupling the first and the second layers of pasta dough around the respective filling; and
    the first roller and the second roller each comprise a respective supporting roller having a peripheral surface, respective molds for shaping the respective first and second layers of pasta dough, the respective molds being each configured to be assembled to and disassembled from the respective supporting roller;
    the shaping device comprising a suction system including a suction line connected with a suction source, the suction system being in fluid communication with respective hollows on the first and second rollers for receiving the first and second layers of the pasta dough;
    the shaping device comprising a dispensing device including a nozzle for dispensing the filling to the molds;
    a control unit including a processor, the control unit configured to control switching on and off of the suction system, the control unit including a plurality of operating modes, including:
        a first operating mode, wherein the control unit is configured to switch on the suction system to shape the first and second layers of pasta dough into the respective hollows before the filling is dispensed between the first and second layers of pasta dough at the coupling station; and
        a second operating mode configured to switch on the suction system at a same time as the dispensing device is dispensing the filling into the respective molds, thereby creating a light vacuum in the hollows of the respective molds to facilitate dispensing of the filling from the dispensing device;
    the control unit also being configured in at least one chosen from the first operating mode and the second operating mode to switch off the suction system once the filling has completed being dispensed between the first and second layers of pasta dough;
    the control unit being configured to be programmed by an operator to select one of the operating modes as a function of physical properties of the filling.

2. The machine according to claim 1, wherein the molds of the first and second roller comprise the respective hollows and respective pressing zones for pressing the respective first and second layers of pasta dough surrounding the respective hollows.

3. The machine according to claim 2, wherein the supporting roller of the first roller has a plurality of grooves configured for conveying air into or out of the hollow of each mold; each hollow having a respective air suction or blowing mouth configured to be in fluid communication with the respective groove.

4. The machine according to claim 2, wherein the supporting roller of the second roller has a plurality of grooves configured for conveying air into or out of the hollow of each mold; each mold having a respective air suction or blowing mouth configured to be in fluid communication with the respective groove.

5. The machine according to claim 1, wherein the shaping device comprises at least one cutting roller acting in conjunction with one of either the first roller or the second roller; the cutting roller comprising a supporting roller having a peripheral surface, and respective blocks positioned on the supporting roller peripheral surface and configured to be assembled to and disassembled from the supporting roller; each block comprising a respective cutter for cutting the first and second layers of pasta dough.

6. The machine according to claim 5, wherein the supporting roller of the cutting roller has a plurality of grooves configured for conveying air into or out of the respective blocks; each respective block having a respective hollow for retaining the pasta product and surrounded by a respective cutter in fluid communication with the respective groove.

7. The machine according to claim 1, wherein the shaping device is extractable from a supporting frame on which the shaping device is mounted.

\* \* \* \* \*